United States Patent [19]
Watari

[11] Patent Number: 6,075,680
[45] Date of Patent: Jun. 13, 2000

[54] MAGNETIC HEAD AND RECORDING/ REPRODUCING APPARATUS HAVING ABRASIVE SLIDERS

[75] Inventor: Hiroshi Watari, Kanagawa, Japan

[73] Assignee: Sony Corporation, Tokyo, Japan

[21] Appl. No.: 09/107,144

[22] Filed: Jun. 30, 1998

[30] Foreign Application Priority Data

Jul. 11, 1997 [JP] Japan .................................. 9-186216

[51] Int. Cl.$^7$ ............................. G11B 5/187; G11B 15/60
[52] U.S. Cl. ....................................... 360/122; 360/130.21
[58] Field of Search .................................... 360/129, 122, 360/130.2, 130.24

[56] References Cited

U.S. PATENT DOCUMENTS 5,781,383  7/1998  Strand ...................................... 360/122

*Primary Examiner*—A. J. Heinz
*Attorney, Agent, or Firm*—Ronald P. Kananen, Esq.; Rader, Fishman & Grauer

[57] ABSTRACT

In a magnetic head having a recording and/or reproducing portion for recording and/or reproducing a signal on/from a magnetic tape and arranged in such a manner that the recording and/or reproducing portion of the magnetic head is made in contact with an edge portion of the magnetic tape along a width direction of the magnetic tape, the recording and/or reproducing portion of the magnetic head is comprised of: a magnetic core for recording and/or reproducing the signal on/from the magnetic tape while being made in contact with the magnetic tape; a first slider made of a material having an abrasion characteristic lower than that of the magnetic core, for being slid on the edge portion of the magnetic tape along the width direction thereof; and a second slider made of a material having an abrasion characteristic higher than that of the magnetic core, and arranged between the magnetic core and the first slider. As a consequence, while the better sliding condition between the fixed magnetic head and the magnetic tape can be maintained for a long time period, the lifetime of the fixed magnetic head can be considerably increased. Furthermore, even when the tape tension of the magnetic recording and/or reproducing apparatus is different from each other, the same material combination of the magnetic core, the slider, and the sub-slider can be used.

6 Claims, 8 Drawing Sheets

MAGNETIC HEAD AND RECORDING/ REPRODUCING APPARATUS HAVING ABRASIVE SLIDERS

BACKGROUND OF THE INVENTION

1. Field of the Invention

The present invention generally relates to a structure of a magnetic head used to record/reproduce a signal on/from a magnetic tape in a magnetic recording and/or reproducing apparatus known as an audio signal recording and/or reproducing apparatus with employment of a magnetic tape. More specifically, the present invention is directed to improvements in a head structure of a magnetic head used while being fixed on a portion of a magnetic tape transporting path, and also a magnetic recording and/or reproducing apparatus with using this magnetic head.

2. Description of the Prior Art

In the conventional magnetic recording and/or reproducing apparatus (for instance, audio signal recording and/or reproducing apparatus) using the magnetic tape 51 as shown in FIG. 1, the signal is recorded on the magnetic tape 51, or the signal is reproduced from the magnetic tape 51 by sliding this magnetic tape 51 and the fixed magnetic head 52. This magnetic head 52 is fixed on a portion of the transporting path of the magnetic tape 51.

Such a fixed magnetic head 52 contains the recording and/or reproducing portion 53 which is slid on the magnetic tape 51. This recording and/or reproducing unit 53 constitutes the housing of the fixed magnetic head 52. This recording and/or reproducing unit 53 is filled into the shield case 54 by using resin 55 in such a manner that this recording and/or reproducing portion 53 is outwardly exposed through the window portion formed in a predetermined position of the shield case 54 made of, for example, a magnetic material such as an Fe—Ni alloy.

Since the sliding characteristic of the resin 55 with respect to the magnetic tape 51 is deteriorated, the exposed area of this fixed magnetic head 52 with respect to the sliding surface of the magnetic tape is preferably minimized. To avoid magnetic coupling between the shield case 54 made of the magnetic material and the magnetic core 56 similarity made of a magnetic material, which magnetic core constitutes the recording and/or reproducing portion 53, the magnetic core 56 must be sufficiently separated from the shield case 54.

As a result, in order to reduce the exposed area of the resin 55, the following method has been introduced. That is, the sliders 57 and 69 made of non-magnetic materials are provided with the recording and/or reproducing portion 53 in addition to the magnetic core 56. In other words, as illustrated in FIG. 3 and FIG. 4, this recording and/or reproducing unit 53 is constituted by setting the sliders 57 and 69 on both sides of a single magnetic core 56. As a concrete non-magnetic material used in such sliders 57 and 69, a metal alloy made of a non-magnetic material, and a sintered body are employed.

On the other hand, as represented in FIG. 2, there is such a magnetic recording and/or reproducing apparatus by employing the rotary head 60 independent from the above-explained magnetic recording and/or reproducing apparatus constituted only by the fixed magnetic head 52. Similar to a video signal recording and/or reproducing apparatus used in a VTR, in order to record/reproduce signals in a frequency range over several MHz, video signals are recorded and/or reproduced on/from the magnetic tape 58 by the rotary magnetic head 60 formed on the rotary drum 59 by the helical scanning system. The rotary magnetic head 60 is arranged in such a manner that this rotary magnetic head 60 is inclined with respect to the transport direction of the magnetic tape 58.

Also, in such a magnetic recording and/or reproducing apparatus, the control signals, the audio signal, or the data signals other than the signals recorded and/or reproduced by the rotary magnetic head 60 are recorded and/or reproduced, depending upon use purposes, by the fixed magnetic head 61 for the control signal, and the fixed magnetic head 62 for the audio signal, which are fixed on positions different from the rotary drum 59.

However, the above-described conventional magnetic recording and/or reproducing apparatuses shown in FIG. 1 and FIG. 2 have the below-mentioned problems to be solved.

First, in the magnetic recording and/or reproducing apparatus indicated in FIG. 2, as the recording and/or reproducing portion 53, the composite structure constructed of the magnetic core 56 made of the magnetic material, and also the sliders 57 and 69 made of the non-magnetic material. Considering now abrasion (wearing) characteristic of such an recording and/or reproducing portion 53 with respect to the magnetic tape 51, it is preferable to realize that the abrasion characteristic of the magnetic core 56 is made coincident with that of the sliders 57 and 69. However, conventionally, it is particularly difficult to select the non-magnetic material of the sliders 57 and 69, which has the abrasion characteristic equivalent to that of the magnetic material of the magnetic core 56.

Assuming now that the sliders 57 and 69 are made by employing such a non-magnetic material having an abrasion characteristic relatively lower than that of the magnetic material of the magnetic core 56, as represented in FIG. 3, the magnetic core 56 is abraded faster than the sliders 57 and 69, so that the surface of the magnetic core 56 is brought into a concave condition with respect to the sliders 57 and 69. As a result, this concave condition may impede better contacts established between the magnetic tape 51 and the magnetic core 56, and further the recording and/or reproducing operation of the magnetic tape 51 by the recording and/or reproducing portion 53 cannot be smoothly carried out.

On the other hand, assuming now that the slider 57 and 69 are made by employing such a non-magnetic material having an abrasion characteristic relatively higher than that of the magnetic material of the magnetic core 56, as represented in FIG. 4, sliders 57 and 69 are abraded faster than the magnetic core 56, so that the surface of the magnetic core 56 is brought into a convex condition with respect to the sliders 57 and 69. As a result, this convex condition may increase pressure at the contact surface of the magnetic tape 51 with respect to the magnetic core 56. As a result, abrasion of the magnetic core 56 is increased, so that the lifetime of the fixed magnetic head 52 would be considerably shortened.

Under such circumstances, conventionally, an Fe—Al— Si alloy and/or Co series amorphous are employed to manufacture the magnetic core 56, whereas such a non-magnetic material as a Cu series alloy, e.g., nickel silver is employed to manufacture the sliders 57 and 69, which owns an abrasion characteristic slightly higher than that of the magnetic core 56.

However, although the sliders 57 and 69 made of the abrasion characteristic slightly higher than that of the magnetic core 56 can maintain the better sliding condition between the magnetic core 56 and the magnetic tape 51, the abrasion of the magnetic core 56 is similarly increased. Therefore, this matrical cannot prevent the lifetime of the fixed magnetic head 52 from being shortened.

On the other hand, as illustrated in FIG. 5, in the magnetic recording and/or reproducing apparatus shown in FIG. 2, since the video signal is recorded by the rotary magnetic head 60 in such a manner that this video signal occupies a major portion of a center portion of the magnetic tape 52 along the width direction (namely, upper/lower direction) (video track), the control signal, the audio signal, or the data signal may be recorded on the edge portions of this magnetic tape 58 by the fixed magnetic heads 61 and 62 along the width direction (control signal track, audio track etc.).

However, in such a magnetic recording and/or reproducing apparatus, as illustrated in FIG. 2, pressure at the contact surfaces of the magnetic tape 58 with respect to the fixed magnetic heads 61 and 62 is made unequal to each other along the width direction of the magnetic tape 58. In other words, as shown in FIG. 6, as to the fixed magnetic head 62 indicated in FIG. 5, pressure at the contact surface of the magnetic tape 58 on the edge side 58a (upper edge portion shown in this drawing) along the width direction is higher than that of the magnetic tape 58 on the center portion side (lower portion shown in this drawing) along the width direction.

As a result, the abrasion of the slider 66 positioned opposite to the edge portion 58a of the magnetic tape 58 along the width direction is considerably increased, as compared with the abrasion of the magnetic core 65, and also the abrasion of the slider 67 arranged on the center portion side of the magnetic tape 58 along the width direction from this magnetic core 65. As a consequence, there is such a problem that this may impede the sliding operation established between the magnetic core 65 and the magnet tape 58.

On the other hand, similar to the above-described fixed magnetic head 52, in FIG. 6, the recording and/or reproducing portion 63 constituted by the magnetic core 65, and the sliders 66, 67 is filled into the shield case 64 for forming the housing of the fixed magnetic head 65 by using resin 68.

To solve these problems, the applicant of the present invention has proposed "MAGNETIC HEAD STRUCTURE" disclosed in Japanese Unexamined Patent Application No. 8-20227 opened in 1996. This magnetic head structure is featured by that, as shown in FIG. 7, the material having the abrasion characteristic higher than that of the magnetic core 15 is employed to fabricate the slider 16 positioned opposite to the edge portion (upper edge portion shown in the drawing) 14a of the magnetic tape 14 along the width direction, over which this edge portion 14a of the magnetic tape 14 along the width direction thereof is slid, and where pressure at the contact surfaces of the magnetic tape 14 is increased.

Then, similar to the conventional magnetic head, the abrasion characteristic of the slider 17, which is slightly higher than that of the magnetic core 15, on the center portion side of the magnetic tape 14 along the width direction is employed to manufacture this slider 17. Accordingly, in the case that the magnetic tape 14 is slid over the magnetic core 15 and the sliders 16 and 17, the following conditions occur.

That is to say, similar to the conventional magnetic head, the abrasion of the slider 17 is slightly increased, as compared with that of the magnetic core 15, so that the surface of this slider 17 is brought into the concave condition with respect to the magnetic core 15. Since the slider 16 employs such a material having the abrasion characteristic lower than that of the magnetic core 15, even when the contact surface pressure of the edge portion 14a of the magnetic tape 14 along the width direction is high, this slider 16 is not considerably abraded different from such a slider 66 of the conventional fixed magnetic head shown in FIG. 6. Thus, the abrasion amount of the slider 16 becomes equal to that of the magnetic core 15, so that the better sliding operations between the fixed magnetic head and the magnetic tape 14 can be maintained for a long time duration.

However, in the VTR with employment of such a video signal recording and/or reproducing apparatus indicated in FIG. 2, since various formats are introduced and the tape tension applied to the magnetic tape is different from each other with respect to each of these different formats, the contact surface pressure of the edge portion of the magnetic tape along the width direction with respect to the fixed magnetic head is different from each other, depending upon variations in this tape tension. Also, since many sorts of magnetic tapes are employed, the degrees of the polishing characteristics of these magnetic tapes which may abrade the above-explained slider are different from each other.

As a result, even such a conventional fixed magnetic head shown in FIG. 7 may have the following negative possibility, depending upon a certain combination between the tape tension and the sort of magnetic tape by the above-explained format. That is, as represented in FIG. 8, both the abrasion amount of the slider 16 slid over the edge portion 14a of the magnetic tape 14 along the width direction becomes smaller than the expected abrasion amount, and thus, the surface of the slider 16 is brought into the convex condition with respect to the magnetic core 15, which may impede the better sliding operation between the magnetic core 15 and the magnetic tape 14.

SUMMARY OF THE INVENTION

The present invention has been made to solve the above-described problems, and therefore, has an object to provide a magnetic head and a magnetic recording and/or reproducing apparatus with employment of this magnetic head capable of maintaining a better sliding condition established between a recording and/or reproducing portion of this magnetic head and a magnetic tape over a long time duration even when various sorts of tape tension and polishing characteristics of magnetic tapes are combined with each other.

A magnetic head, according to an aspect of the present invention, is featured by such a magnetic head having a recording and/or reproducing portion for recording and/or reproducing a signal on/from a magnetic tape and arranged in such a manner that the recording and/or reproducing portion of the magnetic head is made in contact with an edge portion of the magnetic tape along a width direction of the magnetic tape, wherein:

the recording and/or reproducing portion of the magnetic head is comprised of:
   a magnetic core for recording and/or reproducing the signal on/from the magnetic tape while being made in contact with the magnetic tape;
   a first slider made of a material having an abrasion characteristic lower than that of the magnetic core, for being slid on the edge portion of the magnetic tape along the width direction thereof; and
   a second slider made of a material having an abrasion characteristic higher than that of the magnetic core, and arranged between the magnetic core and said first slider.

Also, a magnetic recording and/or reproducing apparatus, according to another aspect of the present invention, is featured by that in a magnetic recording and/or reproducing apparatus including a magnetic head having a recording and/or reproducing portion for recording and/or reproducing a signal on/from a magnetic tape and arranged in such a manner that the recording and/or reproducing portion of the magnetic head is made in contact with an edge portion of the magnetic tape along a width direction of the magnetic tape, wherein:

the recording and/or reproducing portion of the magnetic head is comprised of:
 a magnetic core for recording and/or reproducing the signal on/from the magnetic tape while being made in contact with the magnetic tape;
 a first slider made of a material having an abrasion characteristic lower than that of the magnetic core, for being slid on the edge portion of the magnetic tape along the width direction thereof; and
 a second slider made of a material having an abrasion characteristic higher than that of the magnetic core, and arranged between the magnetic core and the first slider.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiment of the present invention will be described. FIG. 9 to FIG. 12 represent a magnetic head structure and a magnetic recording and/or reproducing apparatus with employment of this magnetic head structure, namely a fixed magnetic head 1 according to a first embodiment of the present invention.

Figure 9:
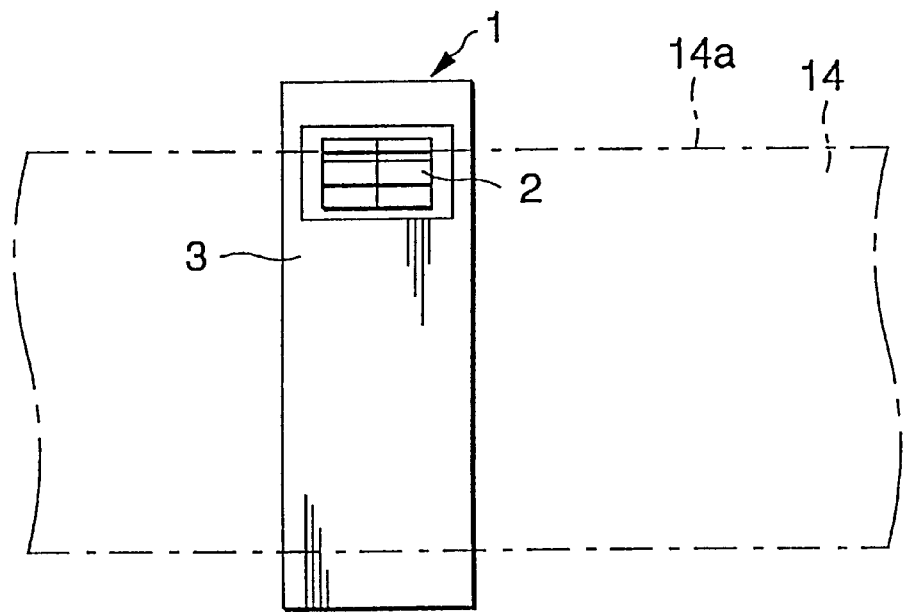
FIG. 9 is a front view for indicating a fixed magnetic head 1 having a magnetic head structure according to a first embodiment of the present invention.
Figure 10:
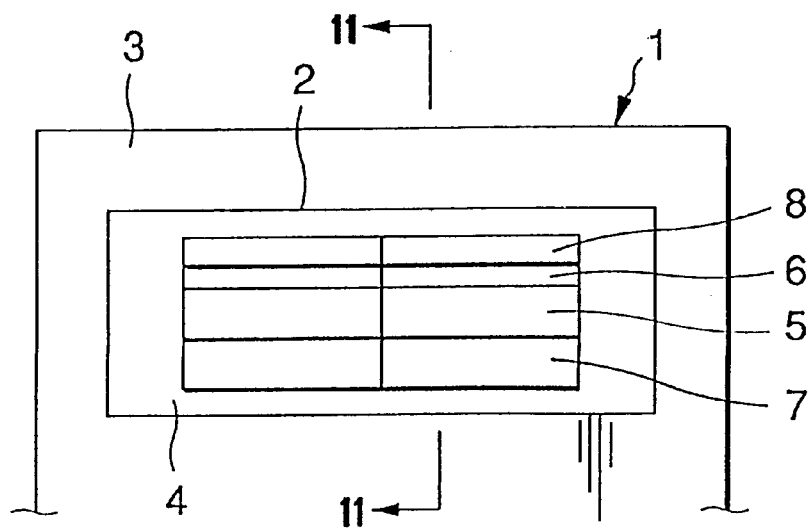
FIG. 10 is an enlarged front view for showing the fixed magnetic head 1 indicated in FIG. 9.

As indicated in FIG. 9 and FIG. 10, a recording and/or reproducing portion 2 of a fixed magnetic head 1 used in such a magnetic recording and/or reproducing apparatus such as a tape recorder constitutes a housing of this fixed magnetic head 1. This recording and/or reproducing portion 2 is filled into a shield case 3 made of a magnetic material, for instance, an Fe—Ni alloy, by using resin 4 in such a manner that this recording and/or reproducing portion 2 is outwardly exposed via a window portion formed in a preselected position of the shield case 3.

The recording and/or reproducing unit 2 owns a magnetic core 5 made of a magnetic material used to record/reproduce an audio signal and the like on/from a magnetic tape 14, and further sliders 6 and 7 made of a non-magnetic material, which are positioned on both sides of this magnetic core 5 so as to reduce an exposed area of the resin 4. Furthermore, a sub-slider 8 is additionally provided on the opposite side (namely, on the side of shield case 3) of the magnetic core 5 of the slider 6.

As indicated in FIG. 9, the fixed magnetic head 1 having the above-described structure is constructed in such a manner that the recording and/or reproducing portion 2 is exposed at a position on the side of the edge portion 14a of the magnetic tape 14 along the width direction. As a material used in such a recording and/or reproducing portion 2, such a material having a superior anti-abrasion characteristic is employed in order to maintain an electric characteristic and a mechanical characteristic over a long time duration.

Figure 11:
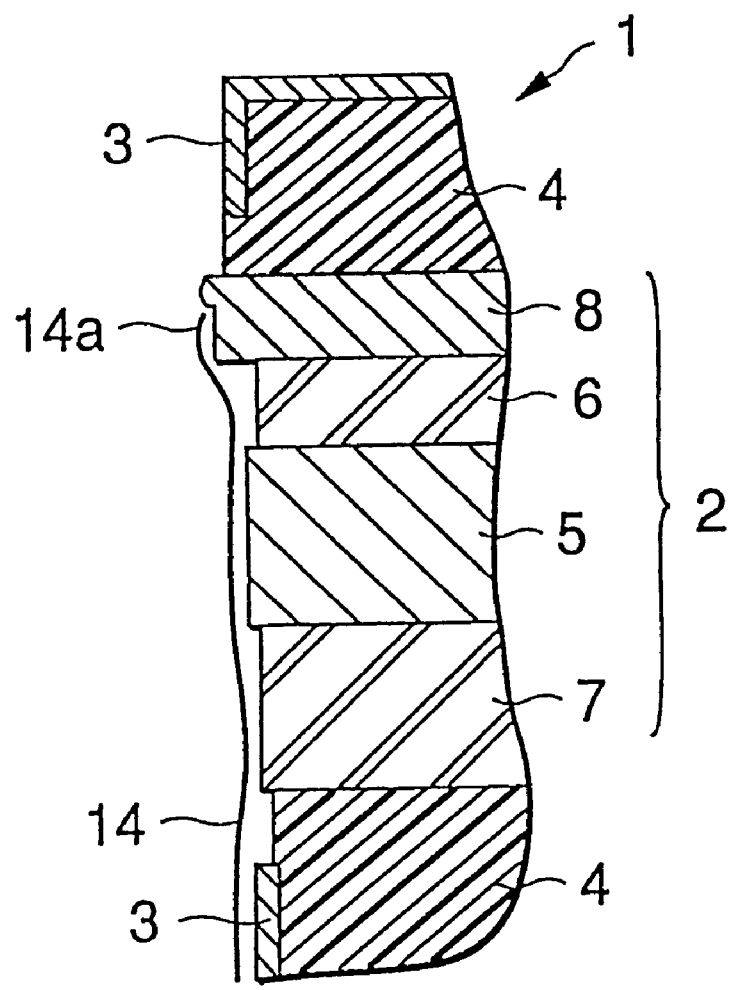
FIG. 11 is a sectional view for representing the fixed magnetic head 1 shown in FIG. 10, taken along a line A—A of FIG. 10.

That is, as indicated in FIG. 11, a material having a higher abrasion characteristic than that of the magnetic core 5 is employed to manufacture the sub-slider 8 located at a position where the edge portion 14a (namely, upper edge portion shown in the drawing) of the magnetic tape 14 is slid and also contact surface pressure of the magnetic tape 14 becomes the highest pressure value.

Also, similar to the conventional sliders, a material having an abrasion characteristic slightly higher than that of the magnetic core 5 is employed to manufacture a slider 7 and another slider 6. The slider 7 is positioned on the side of a central portion (namely, on the side of lower portion shown in the drawing) of the magnetic tape 14 from the magnetic core 5. The slider 6 is located opposite to the slider 7 of the magnetic core 5.

In the fixed magnetic head 1 having such a head structure, when the magnetic tape 14 is slid on the recording and/or reproducing portion 2, as illustrated in FIG. 11, both the sliders 6 and 7 are slightly abraded, as compared with the magnetic core 5, and thus, the surfaces of these sliders 6 and 7 are brought into a slightly concaved condition with respect to the magnetic core 5.

Figure 6:
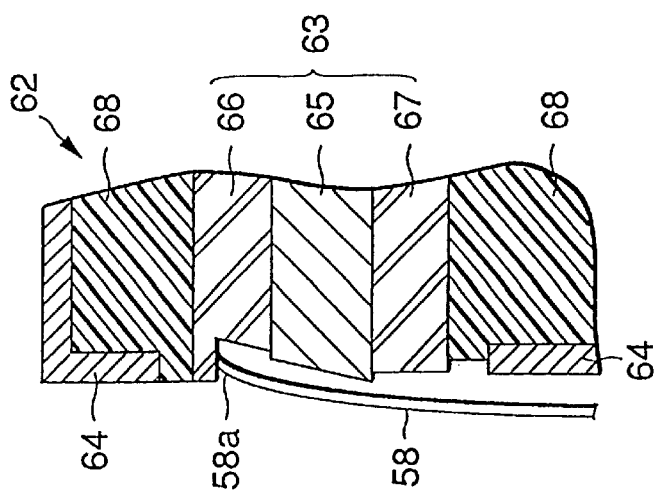
FIG. 6 is a sectional view for indicating the fixed magnetic head 62 shown in FIG. 5, taken along a line D—D of FIG. 5.

Then, since such a material having the higher abrasion characteristic than that of the magnetic core 5 is employed to manufacture the sub-slider 8 located at the position where the edge portion 14a of the magnetic tape 14 is slid and also the contact surface pressure of the magnetic tape 14 becomes the highest pressure value, the abrasion of this sub-slider 8 is not considerably increased, different from the conventional slider 66 (see FIG. 6), but the better sliding condition between the magnetic tape 14 and the recording and/or reproducing portion 2 of the fixed magnetic head 1 can be maintained over a long time duration. As a consequence, the lifetime of the fixed magnetic head 1 can be greatly extended.

Furthermore, as to a combination between a magnetic recording and/or reproducing apparatus "A" having certain tape tension specific thereto and a magnetic tape "a" having certain polishing force specific thereto, in the case that the fixed magnetic head 1 containing the slider 6 made of an optimum material and the sub-slider 8 made of an optimum material is mounted on a magnetic recording and/or reproducing apparatus "B" having lower tape tension than that of the magnetic recording and/or reproducing apparatus A, or in such a case that another magnetic tape "b" having lower polishing force than that of the magnetic tape "a" is driven, an abrasion amount of the sub-slider 8 becomes smaller than an expected abrasion amount, and the surface of this sub-slider 8 becomes convex with respect to the magnetic core 5.

Even when the surface of the sub-slider 8 becomes convex with respect to the magnetic core 5, as illustrated in FIG. 11, the sub-slider 8 and the magnetic core 5 sandwich the slider 6 to thereby be separated from each other, and this slider 6 is slightly abraded by the magnetic core 5 which is slid on the magnetic tape 14. Then, the abrasion of this slider 6 is slightly increased, as compared with that of the magnetic core 5, so that the surface of this slider 6 is brought into the concave condition. As a result, a portion of the magnetic tape 14 located opposite to the slider 6 under concave condition is flexed, so that the portion of the magnetic tape 14 located opposite to the magnetic core 5 can be easily approached to this magnetic core 5 and then can be made in contact therewith. Accordingly, the better sliding condition between the magnetic tape 14 and the magnetic core 5 is not impeded.

In other words, as to a combination between the magnetic recording and/or reproducing apparatus having the high tape tension and the magnetic tape having the high polishing force, in the case that the fixed magnetic head 1 containing the slider 6 made of the optimum material and the sub-slider 8 made of the optimum material is mounted on the magnetic recording and/or reproducing apparatus having the low tape tension, or in such a case that another magnetic tape having the lower polishing force is driven, or when the fixed magnetic head is mounted on the magnetic recording and/or reproducing apparatus having the low tape tension and also the magnetic tape having the low polishing force is slid, the better sliding condition between the magnetic tape 14 and the magnetic core 5 is not impeded.

As a consequence, while the better sliding condition between the fixed magnetic head and the magnetic tape can be maintained for a long time period, the lifetime of the fixed magnetic head can be considerably increased. Furthermore, even when the tape tension of the magnetic recording and/or reproducing apparatus is different from each other, the same material combination of the magnetic core 5, the slider 6, and the sub-slider 8 can be used.

The fixed magnetic head 1, according to this embodiment, employs the recording and/or reproducing portion 2 formed by combining an Fe—Al—Si alloy as the magnetic core 5, nickel silver (Cu—Ni—Zn alloy) as the sliders 6, 7, with non-magnetic stainless steel (SUS 316) as the sub-slider 8 in a magnetic recording and/or reproducing apparatus having tape tension of 50 g.

The following materials other than the above-described materials may be used, namely Co series amorphous as the magnetic core 5; a non-magnetic ferrite material of an Fe—Ni alloy as the sliders 6 and 7; and non-magnetic stainless steel (SUS 304) and non-magnetic ceramics ($Al_2O_3TiC$, $CaTiO_3$) as the sub-slider 8.

Figure 12:
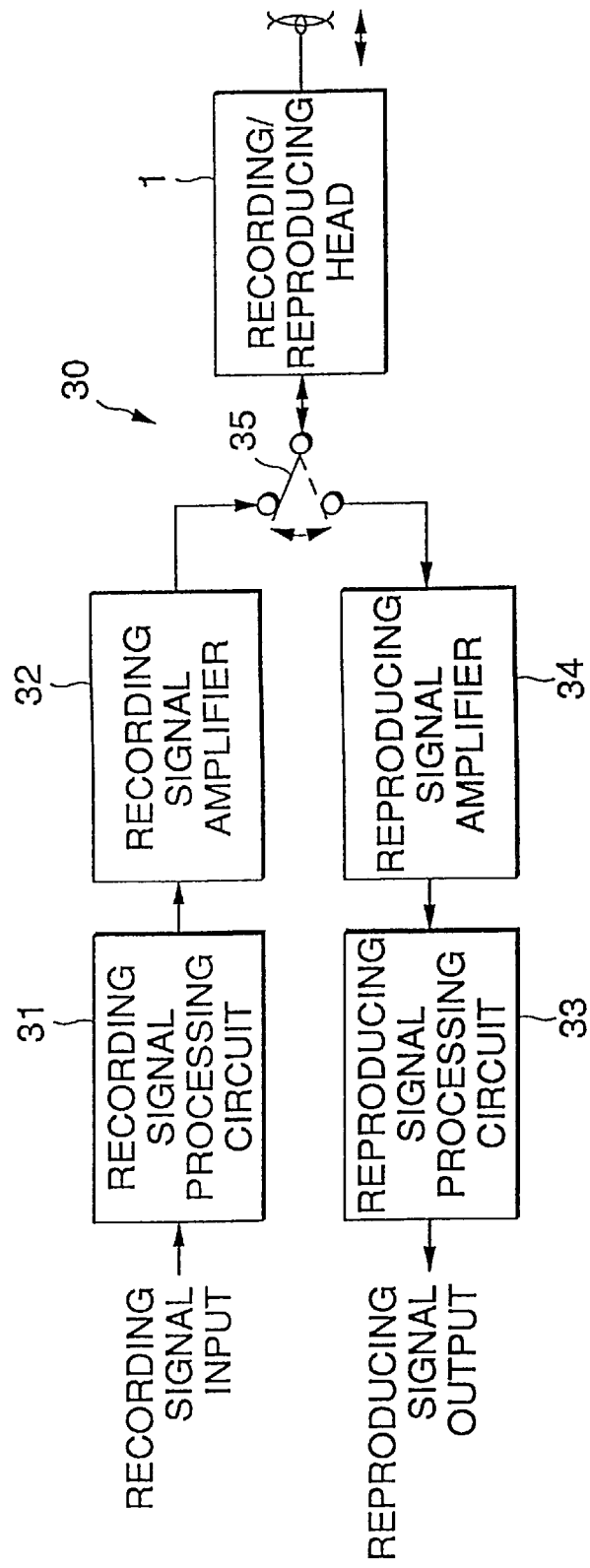
FIG. 12 is a schematic block diagram for indicating an arrangement of a magnetic recording and/or reproducing apparatus 30 with employment of the fixed magnetic head 1.

Such a fixed magnetic head 1 is used in a magnetic recording and/or reproducing apparatus 30 shown in FIG. 12. A recording signal is entered from a microphone and the like into a recording signal processing circuit 31 of this magnetic recording and/or reproducing apparatus 30 to be processed. Then, the processed recording signal is outputted from this recording signal processing circuit 31 to a recording signal amplifier 32. The recording signal amplifier 32 amplifies a recording signal outputted from the recording signal processing circuit 31, and then supplies the amplified recording signal via a recording and/or reproducing switching switch 35 to the fixed magnetic head 1. The fixed magnetic head 1 into which this amplified recording signal is inputted is slid on the magnetic tape 14 in the above-described manner, so that the entered recording signal is recorded on the magnetic tape 14 by this fixed magnetic head 1.

When a signal is reproduced from the magnetic tape 14 in such a magnetic recording and/or reproducing apparatus 30, the recording and/or reproducing switching switch 35 is switched from a position indicated by a solid line as shown in FIG. 12 to another position indicated by a broken line by a control circuit (not shown). Then, the fixed magnetic head 1 slid on the magnetic tape 14 reads recorded data from the magnetic tape 14, and outputs the read signal via the recording and/or reproducing switching switch 35 to a reproducing signal amplifier 34. The reproducing signal amplifier 34 amplifies this read signal to output the amplified signal to a reproducing signal processing circuit 33. This reproducing signal processing circuit 33 processes the received signal to output a reproducing signal to a speaker, and the like.

Figure 13:
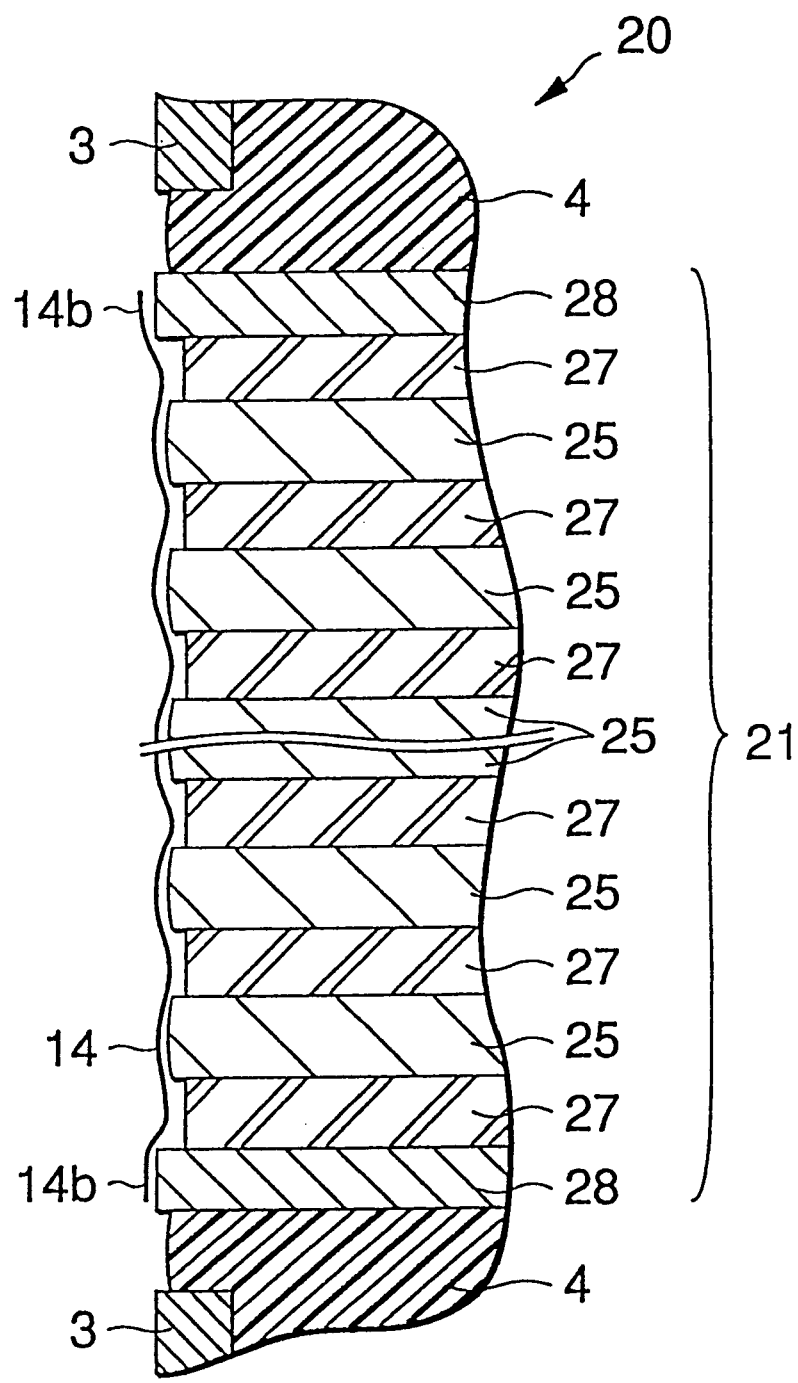
FIG. 13 is a sectional view for showing a fixed magnetic ahead 20 having a magnetic head structure according to a second embodiment of the present invention.

FIG. 13 schematically indicates a magnetic head structure 20 according to a second embodiment of the present invention. In the above-described fixed magnetic head 1 according to the first embodiment of the present invention, the recording and/or reproducing portion 2 is made of the 4-layer structure of the magnetic core 5, the sliders 6, 7, and the sub-slider 8, whereas in this fixed magnetic head 20 according to the second embodiment, a recording and/or reproducing portion 21 is made of such a multi-layer structure, a so-called "multi-track structure". That is, this multi-layer structure is constructed by employing a multi-layer of magnetic cores 25, a multilayer of sliders 27, and two layers of sub-sliders 28. The sliders 27 are arranged in such a manner that these magnetic cores 25 are alternately sandwiched, and have multiple layers, a total number of which is smaller than that of the magnetic cores 25 by 1. The two layers of the sub-sliders 28 are arranged outside both ends of these sandwich structures, respectively.

A material having an anti-abrasion characteristic higher than that of the magnetic core 25 is employed to manufacture the sub-slider 28 of such a fixed magnetic head 20 located at a place where both end portions 14b of the magnetic tape 14 are slid along the width direction, and the highest contact surface pressure is produced. The slider 27 made of such a material having an abrasion characteristic slightly higher than that of the magnetic core 15 is provided between this sub-slider 28 and the magnetic core 25.

As a consequence, even when an abrasion amount of the sub-slider 28 becomes smaller than an expected abrasion amount due to the tension and the polishing characteristic of the magnetic tape 14, and therefore the surface of the sub-slider 28 is brought into the convex condition with respect to the magnetic core 25, the sub-slider 28 and the magnetic core 25 sandwich the slider 27 to thereby be separated from each other, and this slider 27 is slightly abraded by the magnetic core 25 which is slid on the magnetic tape 14. Then, the abrasion of this slider 27 is slightly increased, as compared with that of the magnetic core 25, so that the surface of this slider 27 is brought into the concave condition. As a result, a portion of the magnetic tape 14 located opposite to the slider 27 under concave condition is flexed, so that the portion of the magnetic tape 14 located opposite to the magnetic core 25 can be easily approached to this magnetic core 25 and then can be made in contact therewith.

As a consequence, while the better sliding condition between the fixed magnetic head and the magnetic tape can be maintained for a long time period, the lifetime of the fixed magnetic head can be considerably increased. Furthermore, even when the tape tension of the magnetic recording and/or reproducing apparatus is different from each other, the same material combination of the magnetic core 25, the slider 27, and the sub-slider 28 can be used.

It should be noted in the above-described first embodiment that the fixed magnetic head 1 is fixed and arranged in such a manner that the recording and/or reproducing portion 2 of the fixed magnetic head 1 is exposed to the upper edge portion 14a of the magnetic tape 14 along the width direction. Also, the sub-slider 8 made of the material having the anti-abrasion characteristic higher than that of the magnetic core 5 is provided via the slider 6 on the side of the upper edge portion 14a of the magnetic tape 14 from the magnetic core 5. The magnetic head structure according to the present invention may be alternatively applied to such a case that the highest contact surface pressure is applied to a lower edge side of the magnetic tape 14 along the width direction. In this alternative case, the fixed magnetic head may be arranged in such a manner that the recording and/or reproducing portion of this magnetic head is exposed from the lower edge portion of the magnetic tape along the width direction. Also, the sub-slider made of the material having the anti-abrasion characteristic higher than that of the magnetic core may be provided via the slider on the side of the lower edge portion of the magnetic tape along the width direction from the magnetic core.

Also, in the above-described embodiment, the non-magnetic material is used for the sub-slider 8. Alternatively, since the slider 6 made of the non-magnetic material is present between the sub-slider 8 and the magnetic core 5, it is possible to use such a magnetic material having the same characteristic as that of the magnetic core 5 as the material of the sub-slider 8. In such a case that the material having the same characteristic as that of the magnetic core 5 is used for the sub-slider 8, it is possible to realize such a fixed magnetic head that the better sliding condition between this sub-slider 8 and the magnetic tape can be maintained, while achieving such a high shield effect with respect to external induction noise and also the lifetime thereof can be considerably prolonged.

Figure 1:
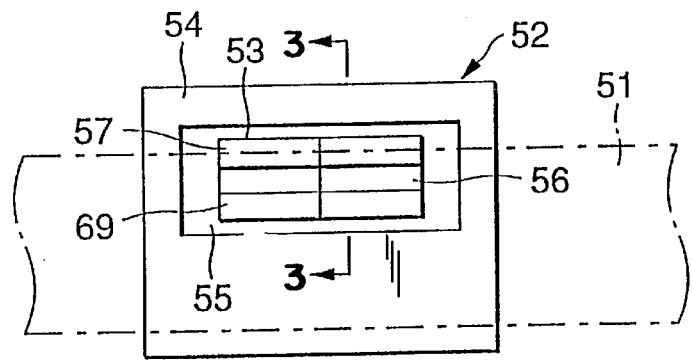
FIG. 1 is an enlarged front view for showing the conventional fixed magnetic head 52.
Figure 2:
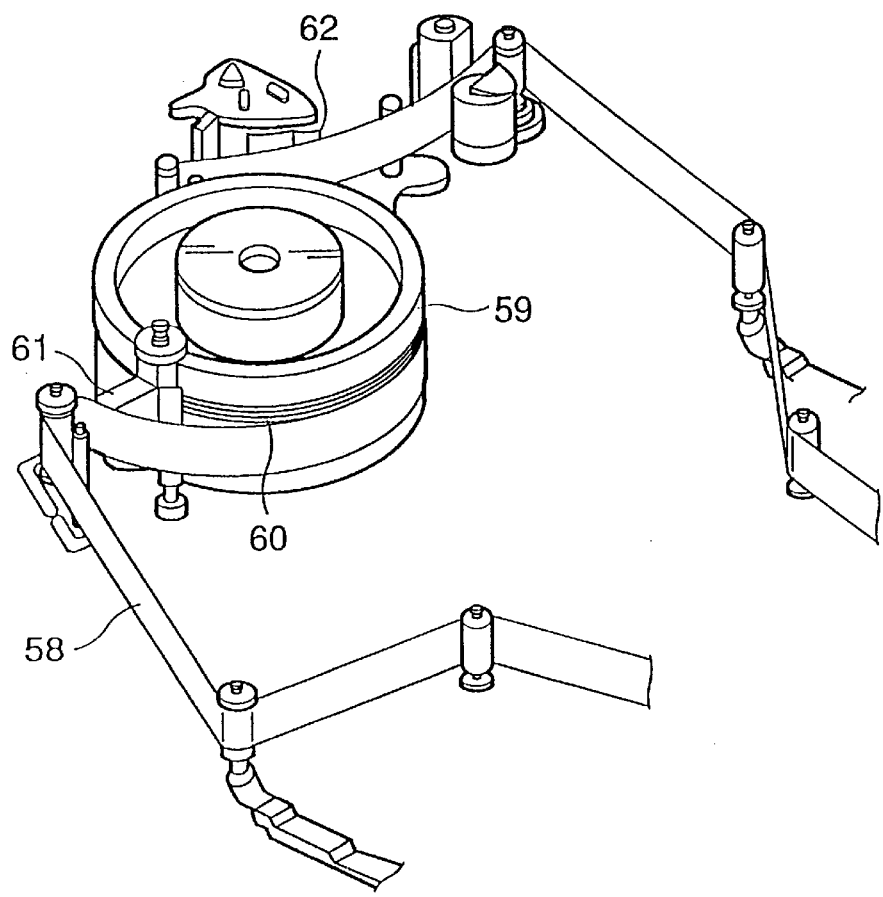
FIG. 2 is a perspective view for indicating the video signal recording and/or reproducing apparatus containing the conventional fixed magnetic heads 61 and 62.
Figure 3:
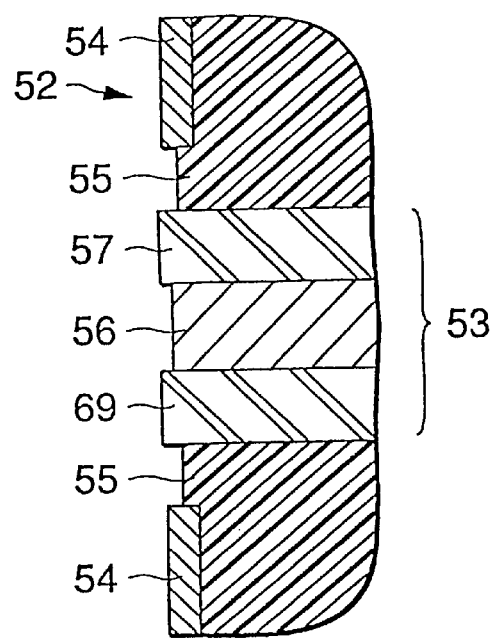
FIG. 3 is a sectional view for indicating the fixed magnetic head 52 shown in FIG. 1, taken along a line C—C of FIG. 1.
Figure 4:
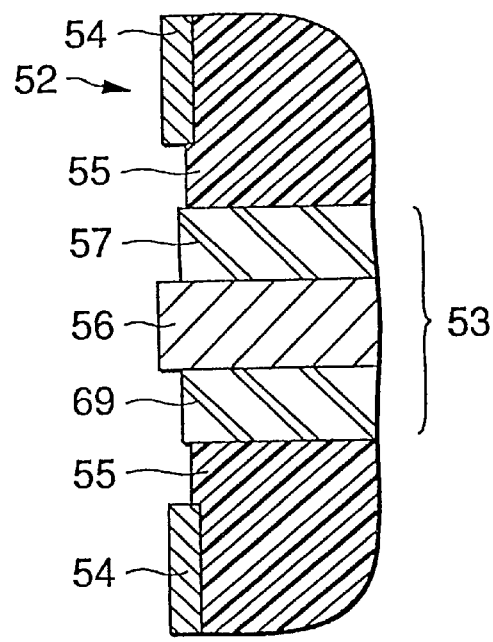
FIG. 4 is another sectional view for indicating the fixed magnetic head 52 shown in FIG. 1, taken along a line C—C of FIG. 1.
Figure 5:
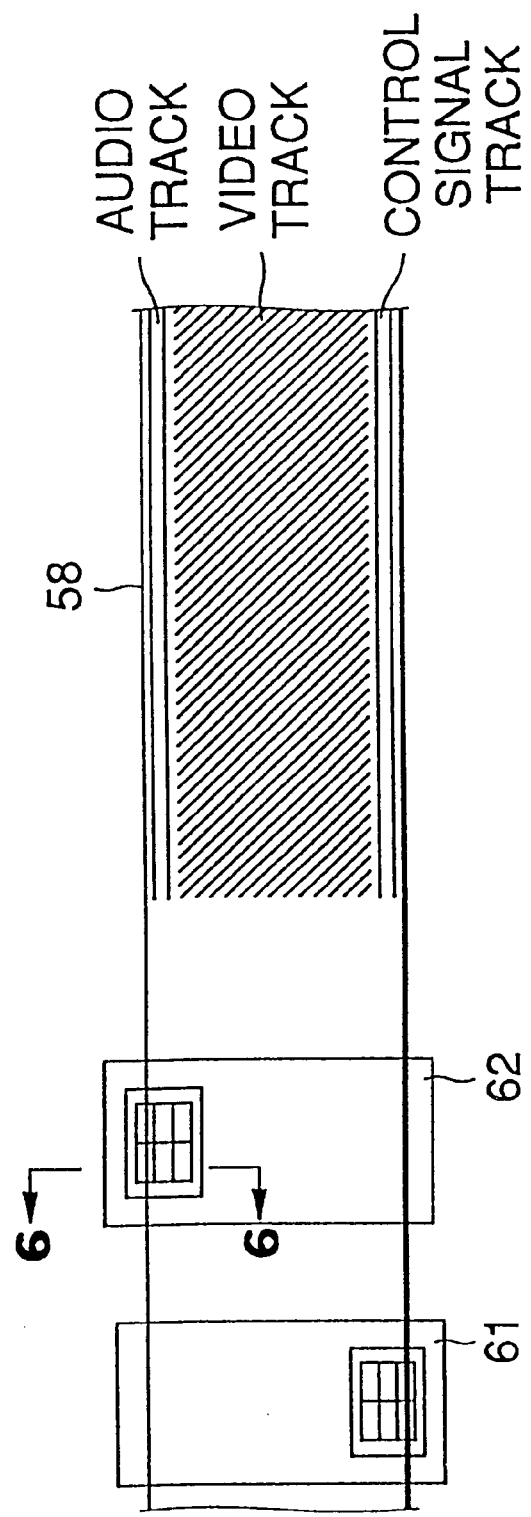
FIG. 5 schematically indicates a positional relationship between the fixed magnetic heads 61, 62 and the magnetic tape 58 indicated in FIG. 2.
Figure 7:
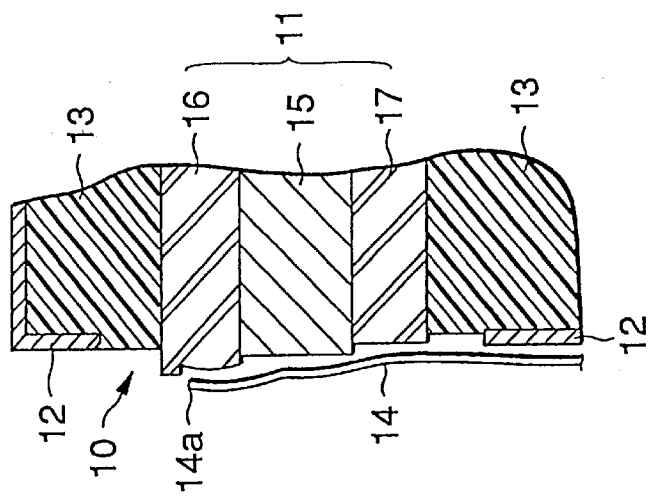
FIG. 7 is a sectional view for showing one operation result of the conventional fixed magnetic head 10.
Figure 8:
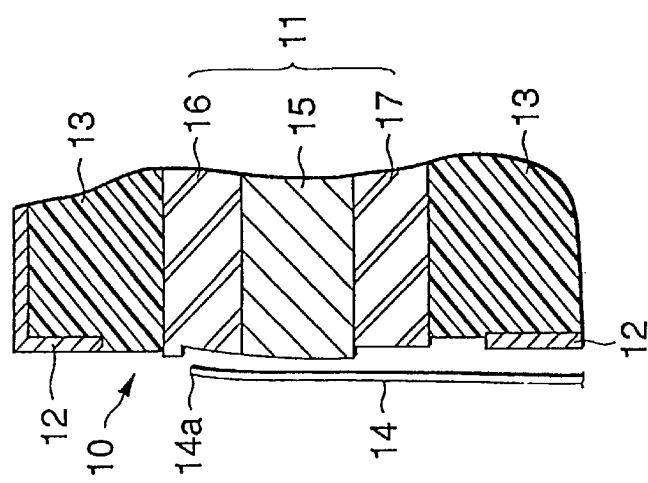
FIG. 8 is a sectional view for representing another operation result of the conventional fixed magnetic head 10 shown in FIG. 7.

Furthermore, the magnetic head structure, according to the present invention, may be employed in such a "magnetic recording and/or reproducing apparatus" by which an audio signal and a data signal are recorded and/or reproduced on/from a magnetic tape by way of only a magnetic head fixed on a portion of a transporting path for the magnetic tape. Moreover, this magnetic head structure may also be used in such a "magnetic recording and/or reproducing apparatus". That is, as indicated in FIG. 1, this magnetic head structure may be used in the magnetic recording and/or reproducing apparatus in which the video signal, the audio signal, or the data signal is recorded on the magnetic tape by the helical scanning system by the rotary magnetic head provided on the rotary drum and arranged oblique to the magnetic tape, while employing at least one fixed magnetic head.

Although the various preferred embodiments of the present invention have been described, the present invention is not limited to the above-described embodiments, but may be modified, or changed based upon the technical scope and spirit of the present invention.

As previously described in detail, in accordance with the magnetic head structure of the present invention, even when the abrasion amount of the sub-slider becomes smaller than the expected abrasion amount due to the tension and the polishing characteristic of the magnetic tape, and therefore the surface of the sub-slider is brought into the convex condition with respect to the magnetic core, the sub-slider and the magnetic core sandwich the slider to thereby be separated from each other, and this slider is slightly abraded by the magnetic core which is slid on the magnetic tape. Then, the abrasion of this slider is slightly increased, as compared with that of the magnetic core, so that the surface of this slider is brought into the concave condition. As a result, a portion of the magnetic tape located opposite to the slider under concave condition is flexed, so that the portion of the magnetic tape located opposite to the magnetic core can be easily approached to this magnetic core and then can be made in contact therewith.

As a consequence, while the better sliding condition between the fixed magnetic head and the magnetic tape can be maintained for a long time period, the lifetime of the fixed magnetic head can be considerably increased. Furthermore, even when the tape tension of the magnetic recording and/or reproducing apparatus is different from each other, the same material combination of the magnetic core 5, the slider 6, and the sub-slider 8 can be used.

Also, in accordance with the "magnetic recording and/or reproducing apparatus" with employment of the magnetic head structure according to the present invention, since the better sliding condition between the magnetic core of the recording and/or reproducing portion of the fixed magnetic head and the magnetic tape can be maintained during the long time duration, the better performance of this recording and/or reproducing operation can be kept for the long time period, and furthermore, the lifetime of the magnetic recording and/or reproducing apparatus can be considerably prolonged.

What is claimed is:

1. A magnetic head having a recording and/or reproducing portion for recording and/or reproducing a signal on/from a magnetic tape where said recording and/or reproducing portion is in contact with an edge portion of said magnetic tape along a width direction of said magnetic tape, wherein:
    said recording and/or reproducing portion of said magnetic head is comprised of:
        a magnetic core for recording and/or reproducing the signal on/from the magnetic tape while being made in contact with said magnetic tape;
        a first slider having an abrasion characteristic lower than that of said magnetic core, for being slid on said edge portion of the magnetic tape along the width direction thereof; and
        a second slider made of a material having an abrasion characteristic higher than that of said magnetic core, located between said magnetic core and said first slider, for increasing contact surface pressure of said magnetic tape.

2. A magnetic head as claimed in claim 1, further comprising:

a shield case fixed at a portion of a transporting path of said magnetic tape, said recording and/or reproducing portion being located inside said shield case.

3. A magnetic head as claimed in claim 2, wherein:

said recording and/or reproducing portion is located inside said shield case so that said recording and/or reproducing portion is exposed to said magnetic tape from a predetermined position of said shield case.

4. A magnetic recording and/or reproducing apparatus including a magnetic head having a recording and/or reproducing portion for recording and/or reproducing a signal on/from a magnetic tape and arranged in such a manner that said recording and/or reproducing portion of the magnetic head is in contact with an edge portion of said magnetic tape along a width direction of said magnetic tape, wherein:

said recording and/or reproducing portion of said magnetic head is comprised of:

a magnetic core for recording and/or reproducing the signal on/from the magnetic tape while in contact with said magnetic tape;

a first slider made of a material having an abrasion characteristic lower than that of said magnetic core, for being slid on said edge portion of the magnetic tape along the width direction thereof; and a second slider made of a material having an abrasion characteristic higher than that of said magnetic core, located between said magnetic core and said first slider, for increasing contact surface pressure of said magnetic tape.

5. A magnetic recording and/or reproducing apparatus as claimed in claim 4, wherein:

said magnetic head is further comprised of a shield case fixed at a portion of a transporting path of said magnetic tape, said recording and/or reproducing portion being located inside said shield case.

6. A magnetic recording and/or reproducing apparatus as claimed in claim 5, wherein:

said recording and/or reproducing portion is located inside said shield case in such a manner that said recording and/or reproducing portion is exposed to said magnetic tape from a predetermined position of said shield case.

* * * * *